US012601308B2

(12) United States Patent
Li et al.

(10) Patent No.: US 12,601,308 B2
(45) Date of Patent: Apr. 14, 2026

(54) COMBUSTION DEVICE FOR AN ENGINE AND METHOD FOR DESIGNING A PISTON

(71) Applicant: WEICHAI POWER CO., LTD., Shandong (CN)

(72) Inventors: Wei Li, Shandong (CN); Xingdong Su, Shandong (CN); Fan Zeng, Shandong (CN); Hairui Zhang, Shandong (CN); Hongzhe Liu, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 18/784,064

(22) Filed: Jul. 25, 2024

(65) Prior Publication Data

US 2025/0035065 A1 Jan. 30, 2025

(30) Foreign Application Priority Data

Jul. 27, 2023 (CN) ......................... 202310927401.0

(51) Int. Cl.
*F02F 3/26* (2006.01)
*F02F 1/24* (2006.01)

(52) U.S. Cl.
CPC . *F02F 3/26* (2013.01); *F02F 1/24* (2013.01)

(58) Field of Classification Search
CPC ........ F02F 3/26; F02F 3/24; F02F 3/28; F02F 1/24; F02F 1/42; F02B 23/08; F02B 23/0621; F02B 23/0627; F16J 1/09
See application file for complete search history.

(56) References Cited

U.S. PATENT DOCUMENTS 4,643,142 A * 2/1987 Klomp ........................ F01L 3/06 123/90.28
5,819,700 A * 10/1998 Ueda ........................ F02B 23/08 123/307

(Continued)

FOREIGN PATENT DOCUMENTS

CN 101128657 A 2/2008
CN 103244304 A 8/2013

(Continued)

OTHER PUBLICATIONS

Chinese Office Action issued by the China National Intellectual Property Administration on Sep. 8, 2023 in corresponding CN Patent Application No. 202310927401.0, with English translation.

*Primary Examiner* — Grant Moubry
(74) *Attorney, Agent, or Firm* — MASCHOFF BRENNAN

(57) ABSTRACT

A combustion device for an engine and a method for designing a piston includes a cylinder head, a cylinder block cooperating with the cylinder head, and a piston disposed in the cylinder block. The cylinder head includes an intake valve setting region and an exhaust valve setting region. The surface of the piston adjacent to the cylinder head includes a first concave surface and a squeezing surface adjacent to the first concave surface. The squeezing surface includes a first squeezing surface corresponding to the intake valve setting region and a second squeezing surface corresponding to the exhaust valve setting region. A combustion chamber is formed between the first concave surface and the cylinder head. The second squeezing surface includes a flow guide groove. The flow guide groove includes two first notches facing the combustion chamber.

12 Claims, 4 Drawing Sheets

(56) References Cited

U.S. PATENT DOCUMENTS

| | | | | |
|---|---|---|---|---|
| 9,476,381 | B2 * | 10/2016 | Böwing .............. | F02B 23/0621 |
| 9,732,665 | B2 * | 8/2017 | Ono ................... | F02M 61/1806 |
| 2003/0000494 | A1 | 1/2003 | Kremer et al. | |
| 2009/0038594 | A1 * | 2/2009 | Naquin ................... | F02B 23/08<br>123/193.6 |

FOREIGN PATENT DOCUMENTS

| | | | | | |
|---|---|---|---|---|---|
| CN | 110630400 | A | | 12/2019 | |
| CN | 212563446 | U | | 2/2021 | |
| CN | 112196662 | B | * | 4/2021 | .............. F02B 23/10 |
| JP | 2010196685 | A | * | 9/2010 | |
| JP | 2018162727 | A | | 10/2018 | |

* cited by examiner

COMBUSTION DEVICE FOR AN ENGINE AND METHOD FOR DESIGNING A PISTON

CROSS-REFERENCE TO RELATED APPLICATION(S)

This application claims priority to Chinese Patent Application No. 202310927401.0 filed Jul. 27, 2023, the disclosure of which is incorporated herein by reference in its entirety.

TECHNICAL FIELD

The present disclosure relates to the technical field of engine combustion, in particular, a combustion device for an engine and a method for designing a piston.

BACKGROUND

Natural gas, which is often used as an alternative fuel for internal combustion engines, has significant advantages such as good economy, no soot emissions, and low CO2 emissions. However, natural gas has a low cetane number, poor ignition performance, high auto-ignition temperature, and slow combustion speed. Therefore, a combination of a tumble flow air passage and a canopy cylinder head is used to improve the tumble ratio and accelerate flame propagation. Squeezing flow, an airflow organization form, is widely used in gasoline engines. In the later stage of a compression process, the radial or transverse airflow movement generated when a certain part of the piston surface and the cylinder head are close to each other may increase the turbulence kinetic energy of the mixture airflow. When the piston moves downward, the combustion gas in a piston pit flows outward to the peripheral annular space at the top of the piston. The squeezing flow formed when the piston moves upward and the reverse squeezing flow formed when the piston moves downward play an important role in accelerating flame propagation and reducing soot.

The intensity of the squeezing flow is mainly determined by the size of the squeezing area and the squeezing gap. In the combination of the canopy cylinder head and the tumble air passage, the airflow in the cylinder block is organized in the form of tumble flow. In the compression process, the squeezing airflow near an exhaust port opposes the tumble flow in the cylinder block. Due to the symmetrical arrangement of the strong tumble combustion system, ideally, the airflow organization in a combustion chamber is symmetrical on two sides. In the practical process, the airflow is easily "unstable" near the compression top dead center, and the cycle changes greatly, resulting in unstable flame propagation after ignition in the cylinder block and high gas consumption.

SUMMARY

The present disclosure provides a combustion device for an engine and a method for designing a piston to solve the problems that the airflow is easily "unstable" near the compression top dead center and that the cycle changes greatly. The problems result in unstable flame propagation after ignition in the cylinder block and high gas consumption.

In a first aspect, embodiments of the present disclosure provide a combustion device for an engine. The device includes a cylinder head, a cylinder block cooperating with the cylinder head, and a piston disposed in the cylinder block.

The cylinder head includes an intake valve setting region and an exhaust valve setting region.

The surface of the piston adjacent to the cylinder head includes a first concave surface and a squeezing surface adjacent to the first concave surface. The squeezing surface includes a first squeezing surface corresponding to the intake valve setting region and a second squeezing surface corresponding to the exhaust valve setting region.

A combustion chamber is formed between the first concave surface and the cylinder head.

The second squeezing surface includes a flow guide groove. The flow guide groove includes two first notches facing the combustion chamber. The two first notches of the flow guide groove are arranged symmetrically with respect to a first center line of the piston. The first center line is perpendicular to a dividing line between the intake valve setting region and the exhaust valve setting region.

Optionally, the flow guide groove includes a first sidewall and a second sidewall. A first end of the first sidewall and a first end of the second sidewall form one first notch of the two first notches. A second end of the first sidewall and a second end of the second sidewall form another first notch of the two first notches.

The first sidewall includes a first sub-sidewall, a second sub-sidewall, and a third sub-sidewall that are connected in sequence. The second sidewall includes a fourth sub-sidewall, a fifth sub-sidewall, and a sixth sub-sidewall that are connected in sequence. The first sub-sidewall is disposed opposite to the fourth sub-sidewall. The second sub-sidewall is disposed opposite to the fifth sub-sidewall. The third sub-sidewall is disposed opposite to the sixth sub-sidewall.

The first sub-sidewall and the third sub-sidewall are arranged symmetrically with respect to the first center line. The fourth sub-sidewall and the sixth sub-sidewall are arranged symmetrically with respect to the first center line. The second sub-sidewall is arranged symmetrically with respect to the first center line. The fifth sub-sidewall is arranged symmetrically with respect to the first center line.

Optionally, the first sub-sidewall is parallel to the fourth sub-sidewall, and the third sub-sidewall is parallel to the sixth sub-sidewall.

The angle between the first sub-sidewall and the first center line is a, where $0° \leq a < 60°$.

Optionally, the flow guide groove also includes a second notch disposed at the second sub-sidewall, and the fifth sub-sidewall is an arc-shaped sidewall that concaves toward the center of the piston.

Optionally, the distance b from the center of the arc-shaped sidewall to the second sub-sidewall, the radius r of the arc-shaped sidewall, and the width c between the first sub-sidewall and the fourth sub-sidewall satisfies: $0.5*c \leq b-r \leq 1.5*c$, where $c>0$.

Optionally, the depth of the flow guide groove in the direction perpendicular to the second squeezing surface is h, and h meets the following: $0<h\leq 5$ mm.

Optionally, the cylinder head includes a canopy cylinder head, at least one intake valve is disposed in an intake valve setting region of the canopy cylinder head, at least one exhaust valve is disposed in an exhaust valve setting region of the canopy cylinder head, and the at least one intake valve and the at least one exhaust valve are symmetrically arranged.

The canopy cylinder head also includes a spark plug disposed at the center of the canopy cylinder head.

In a second aspect, embodiments of the present disclosure provide a method for designing a piston. The method includes the steps described below.

A three-dimensional model of a combustion device for an engine is established. The three-dimensional model of the combustion device is constructed based on the combustion device for the engine described in the first aspect.

The design parameter of a flow guide groove is determined, and the flow guide groove is set on a squeezing surface of the piston according to the design parameter.

The three-dimensional model of the combustion device is simulated, and it is determined whether the flow guide groove meets a requirement according to the simulation result.

Optionally, the flow guide groove includes a first sidewall and a second sidewall. A first end of the first sidewall and a first end of the second sidewall form one first notch. A second end of the first sidewall and a second end of the second sidewall form another first notch.

The first sidewall includes a first sub-sidewall, a second sub-sidewall, and a third sub-sidewall that are connected in sequence. The second sidewall includes a fourth sub-sidewall, a fifth sub-sidewall, and a sixth sub-sidewall that are connected in sequence. The first sub-sidewall is disposed opposite to the fourth sub-sidewall. The second sub-sidewall is disposed opposite to the fifth sub-sidewall. The third sub-sidewall is disposed opposite to the sixth sub-sidewall.

The first sub-sidewall and the third sub-sidewall are arranged symmetrically with respect to the first center line. The fourth sub-sidewall and the sixth sub-sidewall are arranged symmetrically with respect to the first center line. The second sub-sidewall is arranged symmetrically with respect to the first center line. The fifth sub-sidewall is arranged symmetrically with respect to the first center line.

The first sub-sidewall is parallel to the fourth sub-sidewall, and the third sub-sidewall is parallel to the sixth sub-sidewall.

The flow guide groove also includes a second notch disposed at the second sub-sidewall, and the fifth sub-sidewall is an arc-shaped sidewall that concaves toward the center of the piston.

The design parameter includes the angle a between the first sub-sidewall and the first center line, the distance b from the center of the arc-shaped sidewall to the second sub-sidewall, the radius r of the arc-shaped sidewall, the width c between the first sub-sidewall and the fourth sub-sidewall, and the depth h of the flow guide groove in the direction perpendicular to a second squeezing surface.

Optionally, simulating the three-dimensional model of the combustion device and determining whether the flow guide groove meets the requirement according to the simulation result include the steps below.

It is determined whether airflow is formed in the flow guide groove; if not, the depth h of the flow guide groove in the direction perpendicular to the second squeezing surface, the distance b from the center of the arc-shaped sidewall to the second sub-sidewall, or the radius r of the arc-shaped sidewall is adjusted; or if yes, a next operation continues to be performed.

It is determined whether the flow rate of the airflow in the flow guide groove reaches a preset threshold; if not, the width c between the first sub-sidewall and the fourth sub-sidewall is adjusted; or if yes, a next operation continues to be performed.

It is determined whether the flow direction of the airflow in the flow guide groove meets a preset requirement; if not, the angle a between the first sub-sidewall and the first center line is adjusted; or if yes, it is determined that the flow guide groove meets the requirement.

In the solution provided by the present disclosure, the squeezing surface of the piston includes a first squeezing surface corresponding to the intake valve setting region and a second squeezing surface corresponding to the exhaust valve setting region, and a combustion chamber is formed between the first concave surface and the cylinder head so that the squeezing surface of the piston forms two squeezing regions with the intake valve setting region and exhaust valve setting region of the cylinder head to facilitate the formation of a stable tumble flow in the combustion chamber. The second squeezing surface includes a flow guide groove. The flow guide groove includes two first notches facing the combustion chamber. The two first notches of the flow guide groove are arranged symmetrically with respect to a first center line of the piston. The first center line is perpendicular to a dividing line between the intake valve setting region and the exhaust valve setting region. In this manner, symmetrical offset force to the tumble flow in the combustion chamber can be produced, thereby alleviating the instability caused by the one-way offset of the squeezing airflow against the tumble flow. Moreover, the "instability" of the mixture airflow is reduced, the combustion is more stable, the cycle variation is reduced, the thermal efficiency of the engine is improved, and the tendency of knocking is reduced.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

To illustrate the technical solutions in the embodiments of the present disclosure or the technical solutions in the related art more clearly, drawings used in the description of the embodiments or the related art are described briefly hereinafter. Apparently, the drawings described hereinafter illustrate only part of embodiments of the present disclosure. For those skilled in the art, other structures and drawings may be extended and expanded based on basic concepts of element structures, driving methods, and manufacturing methods disclosed and suggested by various embodiments of the present disclosure. It is undoubtedly that these should be within the scope of claims of the present disclosure.

DETAILED DESCRIPTION

To illustrate the objects, technical solutions, and advantages of embodiments of the present disclosure more clearly, the technical solutions in embodiments of the present disclosure will be described clearly and completely in conjunction with drawings in embodiments of the present disclosure. Apparently, the embodiments described are part, not all, of embodiments of the present disclosure. All other embodiments acquired by those skilled in the art based on basic concepts disclosed and suggested by embodiments of the present disclosure are within the scope of the present disclosure.

Figure 1:
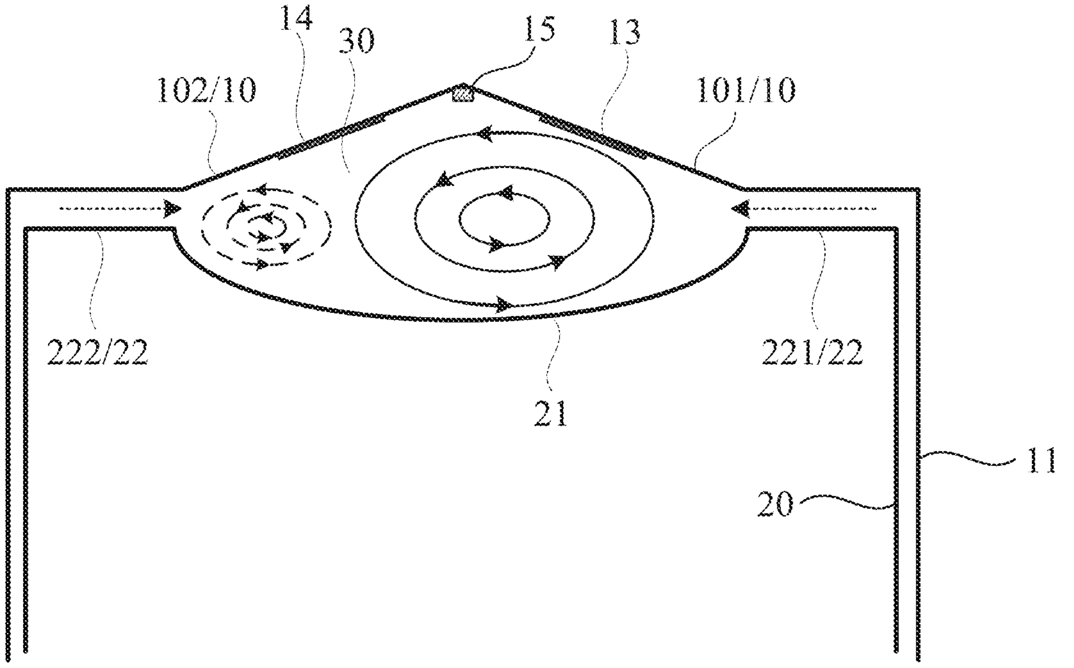
FIG. 1 is a diagram illustrating the structure of a combustion device for an engine according to an embodiment of the present disclosure.
Figure 2:
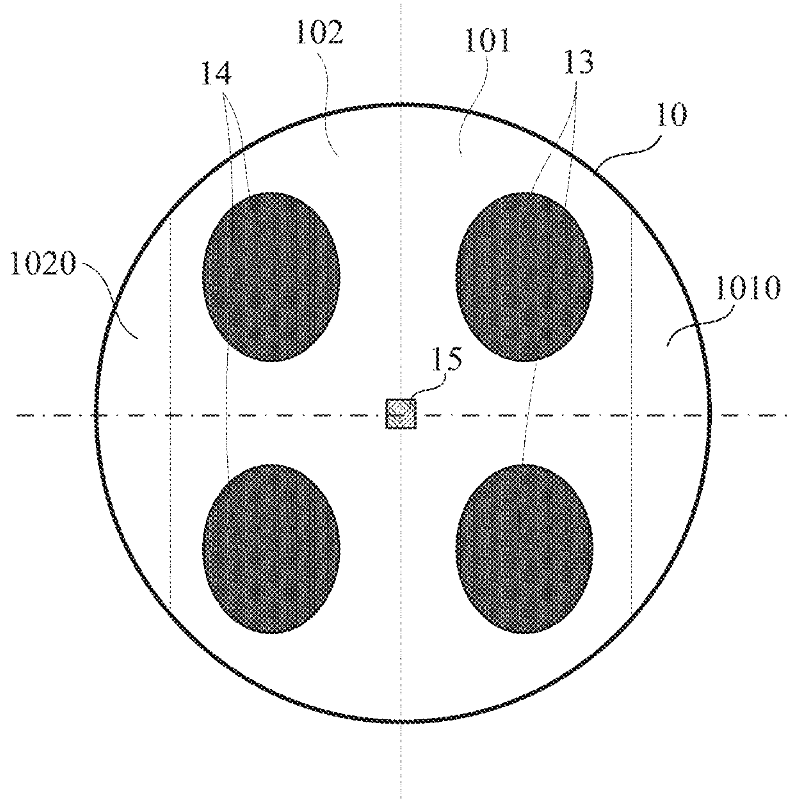
FIG. 2 is a top view of the structure of a combustion device for an engine according to an embodiment of the present disclosure.
Figure 3:
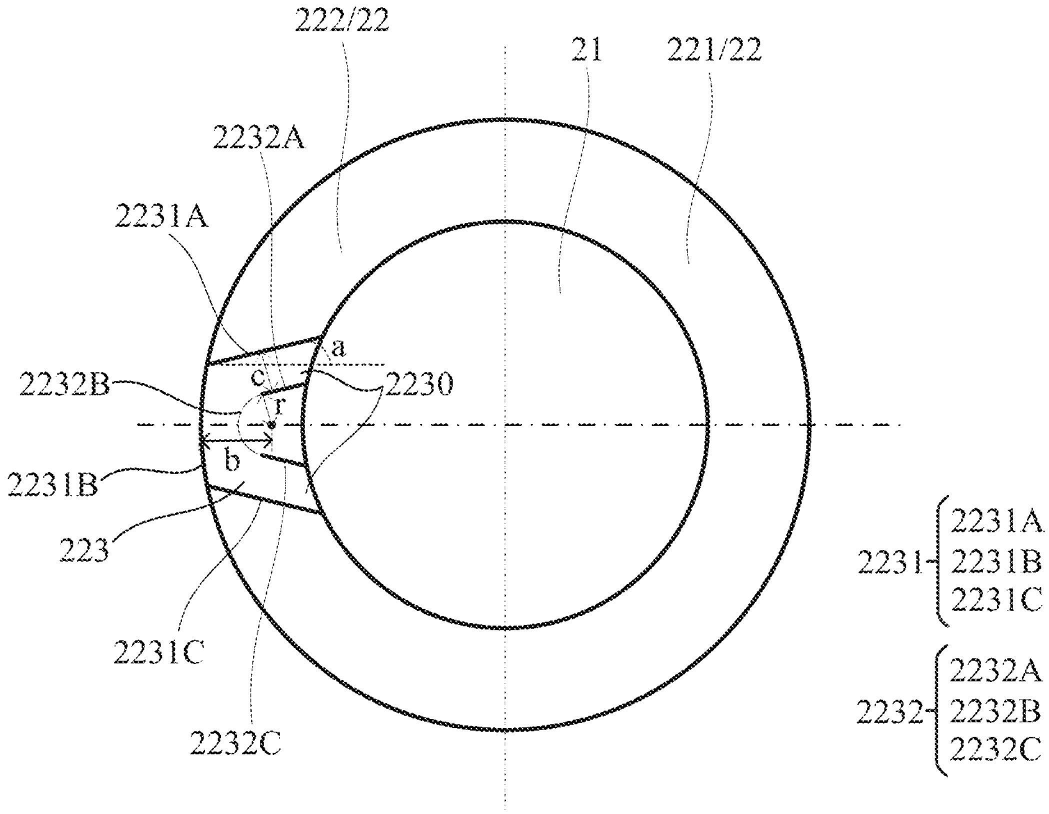
FIG. 3 is a top view of the structure of a piston according to an embodiment of the present disclosure.

FIG. 1 is a diagram illustrating the structure of a combustion device for an engine according to an embodiment of the present disclosure. FIG. 2 is a top view of the structure of a combustion device for an engine according to an embodiment of the present disclosure. FIG. 3 is a top view of the structure of a piston according to an embodiment of the present disclosure. With reference to FIG. 1, FIG. 2, and FIG. 3, the device includes a cylinder head 10, a cylinder block 11 cooperating with the cylinder head 10, and a piston 20 disposed in the cylinder block 11; the cylinder head 10 includes an intake valve setting region 101 and an exhaust valve setting region 102; the surface of the piston 20 adjacent to the cylinder head 10 includes a first concave surface 21 and a squeezing surface 22 adjacent to the first concave surface 21, and the squeezing surface 22 includes a first squeezing surface 221 corresponding to the intake valve setting region 101 and a second squeezing surface 222 corresponding to the exhaust valve setting region 102; a combustion chamber 30 is formed between the first concave 21 surface and the cylinder head 10; the second squeezing surface 222 includes a flow guide groove 223, the flow guide groove 223 includes two first notches 2230 facing the combustion chamber 30, the two first notches 2230 of the flow guide groove 223 are arranged symmetrically with respect to a first center line of the piston 20, and the first center line is perpendicular to a dividing line between the intake valve setting region 101 and the exhaust valve setting region 102.

The engine in the embodiments includes but is not limited to a natural gas engine.

It can be understood that with reference to FIG. 1, a combustion chamber 30 is formed between the cylinder head 10 and the first concave surface 21 of the piston 20. When the piston 20 is compressing toward the cylinder head 10, radial or transverse airflow movement occurs between the squeezing surface 22 of the piston 20 and the cylinder head 10 to increase the turbulence kinetic energy of the mixture airflow, causing the air and the fuel gas (such as natural gas) in the combustion chamber 30 to be fully mixed. In this case, the airflow in the combustion chamber 30 is mainly organized in the form of tumble flow (with reference to an arrow in the solid line in the combustion chamber in FIG. 1), that is, the organized air rotation that rotates around the axis of the cylinder block 11 and is formed during the air intake process is called tumble flow. However, in the actual compression process of the piston 20, the squeezing airflow (with reference to an arrow in the dotted line in the combustion chamber in FIG. 1) on the side of the exhaust valve setting region 102 conflicts with the tumble flow in the combustion chamber 30. In this case, the mixture airflow in the combustion chamber 30 is easily "unstable" near the compression top dead center, and the cycle changes greatly, resulting in unstable flame propagation after the combustion chamber is ignited. As a result, gas consumption is high, and the heat generation efficiency of the engine is reduced.

With reference to FIG. 2, in the compression process of the piston 20, a squeezing region on the intake side 1010 is formed between the first squeezing surface 221 corresponding to the intake valve setting region 101 and the cylinder head 10, and a squeezing region on the exhaust side 1020 is formed between the second squeezing surface 222 corresponding to the exhaust valve setting region 102 and the cylinder head 10. It can be understood that FIG. 2 is only an exemplary illustration, and the specific shape, area, and size of the squeezing region may be set as required, which is not specifically limited in the embodiments of the present disclosure.

With continued reference to FIG. 3, two first notches 2230 of the flow guide groove 223 are disposed toward the combustion chamber 30 and are symmetrical with respect to the first center line of the piston 20, and the first center line is perpendicular to a dividing line between the intake valve setting region 101 and the exhaust valve setting region 102. In this manner, the squeezing airflow on the side of the exhaust valve setting region 102 in the compression process of the piston 20 may be squeezed into the combustion chamber 30 through the two first notches 2230 of the flow guide groove 223. Since the two first notches are symmetrically arranged with respect to the first center line of the piston 20, the same squeezing airflow is formed through the two first notches 2230. Thus, symmetrical offset force to the tumble flow in the combustion chamber 30 can be produced, thereby alleviating the instability caused by the one-way offset of the squeezing airflow against the tumble flow. Moreover, the "instability" of the mixture airflow is reduced, the combustion is more stable, the cycle variation is reduced, and the thermal efficiency of the engine is improved. In addition, since the temperature on the exhaust valve side is high and the knocking tendency is large, arranging the flow guide groove 223 on the second squeezing surface 222 can make the distance between the cooling oil channel of the piston 20 and the squeezing surface 22 of the piston 20 reduced. Thus, the surface temperature of the piston 20 on the exhaust valve side is reduced, the temperature of the unburned mixture airflow on the exhaust valve side is lowered, and the reduction of the knocking tendency is facilitated.

It should be noted that the specific shape of flow guide groove 223 may be set as required. As long as the two first notches 2230 are arranged symmetrically with respect to the first center line of the piston 20, the flow of the mixture in the combustion chamber can be induced. In this manner, the "instability" of the mixture airflow is alleviated, the combustion is more stable, the cycle variation is reduced, and the thermal efficiency of the engine is improved.

In the embodiment, the squeezing surface of the piston includes a first squeezing surface corresponding to the intake valve setting region and a second squeezing surface corresponding to the exhaust valve setting region, and a combustion chamber is formed between the first concave surface and the cylinder head so that the squeezing surface of the piston forms two squeezing regions with the intake valve setting region and exhaust valve setting region of the cylinder head to facilitate the formation of a stable tumble flow in the combustion chamber. The second squeezing surface includes a flow guide groove. The flow guide groove includes two first notches facing the combustion chamber. The two first notches of the flow guide groove are arranged symmetrically with respect to a first center line of the piston. The first center line is perpendicular to a dividing line between the intake valve setting region and the exhaust valve setting region. In this manner, symmetrical offset force to the tumble flow in the combustion chamber can be produced, thereby alleviating the instability caused by the one-way offset of the squeezing airflow against the tumble flow. Moreover, the "instability" of the mixture airflow is reduced, the combustion is more stable, the cycle variation is reduced, the thermal efficiency of the engine is improved, and the tendency of knocking is reduced.

Optionally, with continued reference to FIGS. 1 and 2, the cylinder head 10 includes a canopy cylinder head, at least one intake valve 13 is disposed in an intake valve setting region 101 of the canopy cylinder head, at least one exhaust valve 14 is disposed in an exhaust valve setting region 102 of the canopy cylinder head, and the at least one intake valve 13 and the at least one exhaust valve 14 are symmetrically arranged; the canopy cylinder head also includes a spark plug 15 disposed at the center of the canopy cylinder head.

Specifically, the specific number and shape of the intake valves 13 and the exhaust valves 14 disposed in the intake valve setting region 101 and the exhaust valve setting region 102, respectively may also be set as required. No specific limitation is imposed in the embodiments of the present disclosure. FIG. 2 is only an exemplary illustration. Preferably, multiple intake valves 13 disposed in the intake valve setting region 101 are symmetrically disposed with respect to the first center line, and multiple exhaust valves 14 disposed in the exhaust valve setting region 102 are also symmetrically disposed with respect to the first center line so that the airflow organization in the combustion chamber 30 is symmetrical on two sides.

Further, since the cylinder head 10 is a canopy-type cylinder head, when the piston 20 reaches the top dead center in the combustion chamber 30, a distance exists between the top surface of the piston 20 and the cylinder head 10. In this case, a large amount of combustible fuel gas is gathered into a more concentrated pile at the top center of the piston 20 and is closer to the spark plug 15, and ignition or compression ignition is faster and more complete, thus reducing diffusion combustion and causing waste due to exhaustion that is too late to be burned.

Optionally, with continued reference to FIG. 3, the flow guide groove 223 includes a first sidewall 2231 and a second sidewall 2232, a first end of the first sidewall 2231 and a first end of the second sidewall 2232 form a first notch 2230, and a second end of the first sidewall 2231 and a second end of the second sidewall 2232 form the other first notch 2230; the first sidewall 2231 includes a first sub-sidewall 2231A, a second sub-sidewall 2231B, and a third sub-sidewall 2231C that are connected in sequence, the second sidewall 2232 includes a fourth sub-sidewall 2232A, a fifth sub-sidewall 2232B, and a sixth sub-sidewall 2232C that are connected in sequence, the first sub-sidewall 2231A is disposed opposite to the fourth sub-sidewall 2232A, the second sub-sidewall 2231B is disposed opposite to the fifth sub-sidewall 2232B, and the third sub-sidewall 2231C is disposed opposite to the sixth sub-sidewall 2232C; the first sub-sidewall 2231A and the third sub-sidewall 2231C are arranged symmetrically with respect to the first center line, the fourth sub-sidewall 2232A and the sixth sub-sidewall 2232C are arranged symmetrically with respect to the first center line, the second sub-sidewall 2231B is arranged symmetrically with respect to the first center line, and the fifth sub-sidewall 2232B is arranged symmetrically with respect to the first center line.

Specifically, the sidewalls of the flow guide groove 223 are the first sidewall 2231 and the second sidewall 2232. In the compression process of the piston 20, a squeezing airflow may be gradually formed in the flow guide groove 223 and is squeezed into the combustion chamber 30 through the two first notches 2230. The first sub-sidewall 2231A and the third sub-sidewall 2231C are symmetrically arranged with respect to the first center line, the fourth sub-sidewall 2232A and the sixth sub-sidewall 2232C are symmetrically arranged with respect to the first center line, the second sub-sidewall 2231B is symmetrically arranged with respect to the first center line, and the fifth sub-sidewall 2232B is symmetrically arranged with respect to the first center line. Therefore, the squeezing airflow formed at the two first notches 2230 is also the same. Further, whether a stable squeezing airflow can be formed in the flow guide groove 223 is related to the depth and the specific structure of the flow guide groove 223. The depth and the structure may be set as required. In addition, the flow rate of the airflow is affected by the width of the two first notches 2230. In this manner, the width of the two first notches 2230 may be adjusted as required.

Optionally, with continued reference to FIG. 3, the first sub-sidewall 2231A is parallel to the fourth sub-sidewall 2232A, and the third sub-sidewall 2231C is parallel to the sixth sub-sidewall 2232C; the angle between the first sub-sidewall and the first center line is a, where $0° \leq a < 60°$.

Specifically, the first sub-sidewall 2231A is parallel to the fourth sub-sidewall 2232A to form a first sub-groove, and the third sub-sidewall 2231C is parallel to the sixth sub-sidewall 2232C to form a second sub-groove. The first sub-groove and the second sub-groove are configured to be parallel structures so that the airflow formed in the two sub-grooves can be more stable. Further, the airflow coming out through the two first notches 2230 is more stable, thus avoiding strong conflict with the tumble flow in the combustion chamber 30 and avoiding affecting the stability of the mixture airflow in the combustion chamber 30.

Further, the angle between the first sub-sidewall 2231A and the first central line is a, that is, the angle between the first sub-groove and the first central line is a, and the first sub-sidewall 2231A and the third sub-sidewall 2231C are symmetrically arranged with respect to the first central line so that the angle between the third sub-sidewall 2231C and the first central line is a, that is, the angle between the second sub-groove and the first central line is a. The adjustment of the size of a may adjust the direction of the two first notches 2230 in the combustion chamber 30. In other words, the direction of airflow formed in the flow guide groove 223 can be adjusted, and the flow of the mixture airflow in the combustion chamber 30 can be induced so that the "instability" of the mixture airflow is reduced, and the combustion is more stable.

It should be noted that the maximum value of the angle a between the first sub-sidewall 2231A and the first center line is actually related to the specific structure of the piston 20. When the piston 20 has a cylindrical structure and a perfect circular section, the value of a needs to be less than 45°. When the piston 20 has an elliptical section; the short axis of the elliptical section overlaps the first center line; the long axis of the elliptical section is perpendicular to the first center line, the value of a may be greater than or equal to 45°. Considering the specific application of the piston 20 in the actual structure, the maximum value of a may be less than 60° to ensure reliable operation of the piston 20. The specific value of a may be set as required and is not limited thereto.

Optionally, with continued reference to FIG. 3, the flow guide groove 223 also includes a second notch disposed at the second sub-sidewall 2231B, and the fifth sub-sidewall 2232B is an arc-shaped sidewall that concaves toward the center of the piston 20.

Specifically, the flow guide groove 223 also includes a second notch disposed at the second sub-sidewall 2231B. It can be understood that the flow guide groove 223 is disposed through the second squeezing surface 222. In this case, the fifth sub-sidewall 2232B is directly opposite to the cylinder block 11 to form a third sub-groove. Only the position of the fifth sub-sidewall 2232B needs to be adjusted to freely adjust the width of the third sub-groove. Due to the circular structure of the outer wall of the piston 20, the second sub-sidewall 2231B is a curved arc-shaped sidewall. In this case, the fifth sub-sidewall 2232B may be set to a curved arc-shaped sidewall bent toward the center of the piston 20 so that the third sub-groove is directed toward the center of the piston 20, thereby facilitating the formation of a stable airflow in the sub-groove.

Optionally, with continued reference to FIG. 3, the distance b from the center of the arc-shaped sidewall to the second sub-sidewall 2231B, the radius r of the arc-shaped sidewall, and the width c between the first sub-sidewall 2231A and the fourth sub-sidewall 2232A satisfies: $0.5*c \le b-r \le 1.5*c$, where $c>0$.

Specifically, the width between the first sub-sidewall 2231A and the fourth sub-sidewall 2232A is c, and then the width between the third sub-sidewall 2231C and the sixth sub-sidewall 2232C is also c, and the distance between the center of the second sub-sidewall 2231B and the center of the fifth sub-sidewall 2232B is (b−r). It can be understood that (b−r) is also the minimum width of the third sub-groove formed between the edge of the piston 20 corresponding to the second notch and the fifth sub-sidewall 2232B. The configuration that $0.5*c \le b-r \le 1.5*c$ can make the width difference between the first sub-groove formed by the first sub-sidewall 2231A and the fourth sub-sidewall 2232A, the second sub-groove formed by the third sub-sidewall 2231C and the sixth sub-sidewall 2232C, and the third sub-groove neither too big nor too small, and the first sub-groove, the second sub-groove, and the third sub-groove are smoothly connected. Thus, it is ensured that the airflow formed in the flow guide groove 223 is more stable.

Figure 4:
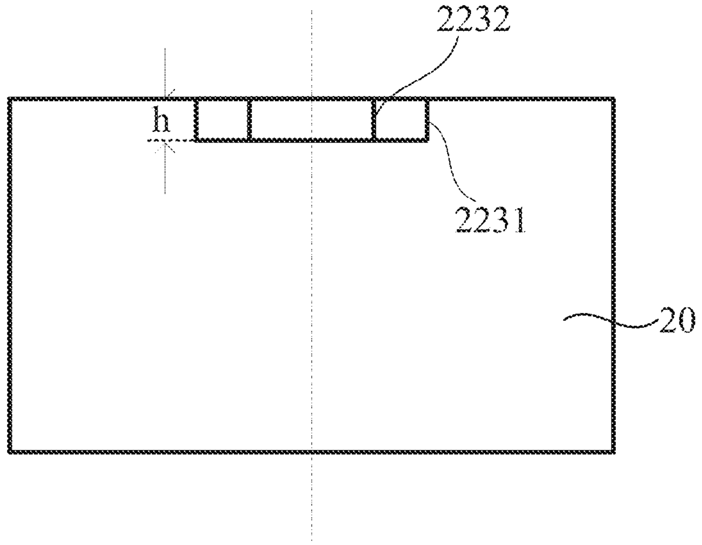
FIG. 4 is a side view of the structure of a piston according to an embodiment of the present disclosure.

Optionally, FIG. 4 is a side view of the structure of a piston according to an embodiment of the present disclosure. As shown in FIGS. 3 and 4, the depth of the flow guide groove 223 in the direction perpendicular to the second squeezing surface 222 is h, and h meets the following: $0<h\le 5$ mm.

Specifically, h1 is the maximum preset value of the depth of the flow guide groove 223 in the direction perpendicular to the second squeezing surface 222 and may be set as required. The depth h of the flow guide groove 223 in the direction perpendicular to the second squeezing surface 222 may be adjusted according to whether a stable squeezing airflow can be formed in the flow guide groove 223. If the depth value of the flow guide groove 223 in the direction perpendicular to the second squeezing surface 222 is too large, the strength of the formed airflow may be too weak on the one hand, and on the other hand, the strength of the piston 20 may deteriorate, affecting the reliability of the piston 20. If the depth value of the flow guide groove 223 in the direction perpendicular to the second squeezing surface 222 is too small, a stable airflow may not be formed. Therefore, the specific depth value of the flow guide groove 223 in the direction perpendicular to the second squeezing surface 222 may be adjusted according to the actual simulation experiment results and is not specifically limited herein.

Preferably, the specific size of the depth h of the flow guide groove 223 in the direction perpendicular to the second squeezing surface 222 satisfies the following: 3 mm$\le h \le$5 mm. Further, the specific value of the depth h may be adjusted according to the squeezing effect generated during the operation of the piston 20 to ensure that a stable airflow can be formed in the flow guide groove 223.

Figure 5:
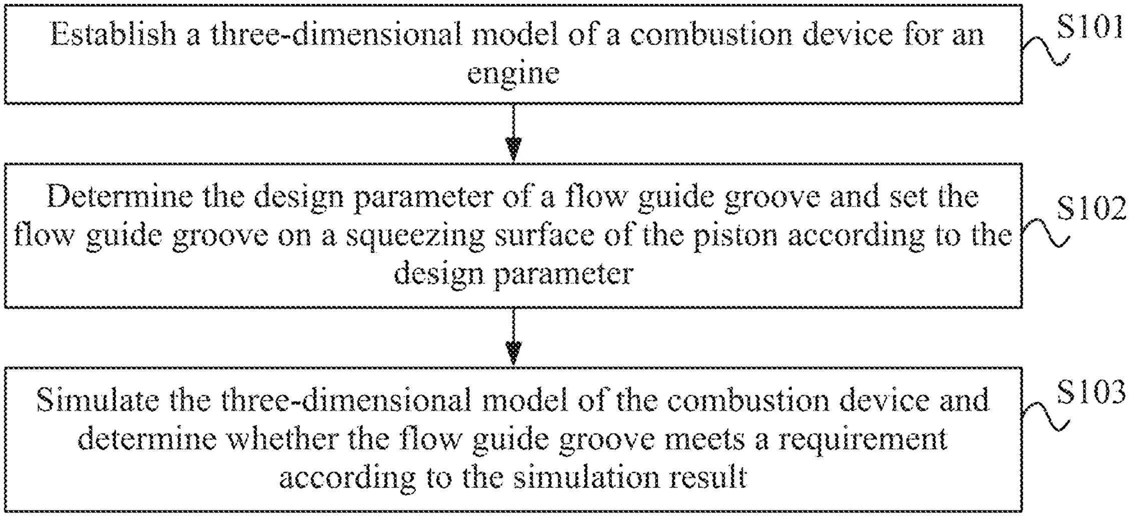
FIG. 5 is a flowchart of a method for designing a piston according to an embodiment of the present disclosure.

Based on the same inventive concept, embodiments of the present disclosure also provide a method for designing a piston. FIG. 5 is a flowchart of a method for designing a piston according to an embodiment of the present disclosure. With reference to FIGS. 1 to 5, the method specifically includes the following steps:

In S101, a three-dimensional model of a combustion device for an engine is established.

The three-dimensional model of the combustion device is constructed based on the combustion device for an engine provided in any of the preceding embodiments.

In S102, the design parameter of a flow guide groove is determined, and the flow guide groove is set on a squeezing surface of the piston according to the design parameter.

In S103, the three-dimensional model of the combustion device is simulated, and it is determined whether the flow guide groove meets a requirement according to the simulation result.

Specifically, the three-dimensional model of the combustion device for an engine is constructed based on the combustion device for an engine provided in any of the preceding embodiments, and then the simulation result obtained by the three-dimensional model simulation calculation, such as cylinder pressure, heat release rate, and tumble ratio, are compared with the test result of an actual product. After that, when the calibration error reaches the preset threshold range, it is determined that the three-dimensional model of the combustion device for an engine is relatively accurate, and the actual experimental result can be actually restored when analysis is performed based on the simulation model, thereby facilitating the accurate design of the dimensional parameters of the flow guide groove. Thus, the final actual product meets the design requirement. When the flow guide groove is specifically designed, the design parameter of the flow guide groove may be determined first and defined in the three-dimensional model so that the squeezing surface of the piston in the three-dimensional model forms a flow guide groove according to the design parameter. Then the three-dimensional model of the combustion device is simulated, and it is determined whether the flow guide groove meets the requirement based on the simulation result. The specific requirement may be set as required. For example, a stable squeezing airflow can be formed in the flow guide groove, and the direction and speed of the airflow can achieve the desired effect. In this manner, in the compression process of the piston, the final designed piston forms a symmetrical squeezing airflow through the flow guide groove, and symmetrical offset force to the tumble flow in the combustion chamber can be produced, thereby alleviating the instability caused by the one-way offset of the squeezing airflow against the tumble flow. Moreover, the "instability" of the mixture airflow is reduced, the combustion is more stable, the cycle variation is reduced, the thermal efficiency of the engine is improved, and the tendency of knocking is reduced.

Optionally, with continued reference to FIGS. 3 and 4, the flow guide groove 223 includes a first sidewall 2231 and a second sidewall 2232, a first end of the first sidewall 2231 and a first end of the second sidewall 2232 form a first notch 2230, and a second end of the first sidewall 2231 and a second end of the second sidewall 2232 form the other first notch 2230; the first sidewall 2231 includes a first sub-sidewall 2231A, a second sub-sidewall 2231B, and a third sub-sidewall 2231C that are connected in sequence, the second sidewall 2232 includes a fourth sub-sidewall 2232A, a fifth sub-sidewall 2232B, and a sixth sub-sidewall 2232C that are connected in sequence, the first sub-sidewall 2231A is disposed opposite to the fourth sub-sidewall 2232A, the second sub-sidewall 2231B is disposed opposite to the fifth sub-sidewall 2232B, and the third sub-sidewall 2231C is disposed opposite to the sixth sub-sidewall 2232C; the first sub-sidewall 2231A and the third sub-sidewall 2231C are arranged symmetrically with respect to the first center line, the fourth sub-sidewall 2232A and the sixth sub-sidewall 2232C are arranged symmetrically with respect to the first center line, the second sub-sidewall 2231B is arranged symmetrically with respect to the first center line, and the fifth sub-sidewall 2232B is arranged symmetrically with respect to the first center line; the first sub-sidewall 2231A is parallel to the fourth sub-sidewall 2232A, and the third sub-sidewall 2231C is parallel to the sixth sub-sidewall 2232C; the flow guide groove 223 also includes a second notch disposed at the second sub-sidewall 2231B, and the fifth sub-sidewall 2232B is an arc-shaped sidewall that concaves toward the center of the piston 20.

The design parameter includes the angle a between the first sub-sidewall and the first center line, the distance b from the center of the arc-shaped sidewall to the second sub-sidewall, the radius r of the arc-shaped sidewall, the width c between the first sub-sidewall and the fourth sub-sidewall, and the depth h of the flow guide groove in the direction perpendicular to a second squeezing surface.

Specifically, the structure of the flow guide groove 223 may be shown in FIG. 3. In the simulation process, each design parameter of the flow guide groove 223 is adjusted according to the real-time simulation result so that the structure of the flow guide groove 223 can be continuously improved. In this manner, it is ensured that the airflow generated in the finally-obtained flow guide groove 223 can induce the flow of the mixture airflow in the combustion chamber. Moreover, the "instability" of the mixture airflow is reduced, the combustion is more stable, the cycle variation is reduced, and the thermal efficiency of the engine is improved.

Figure 6:
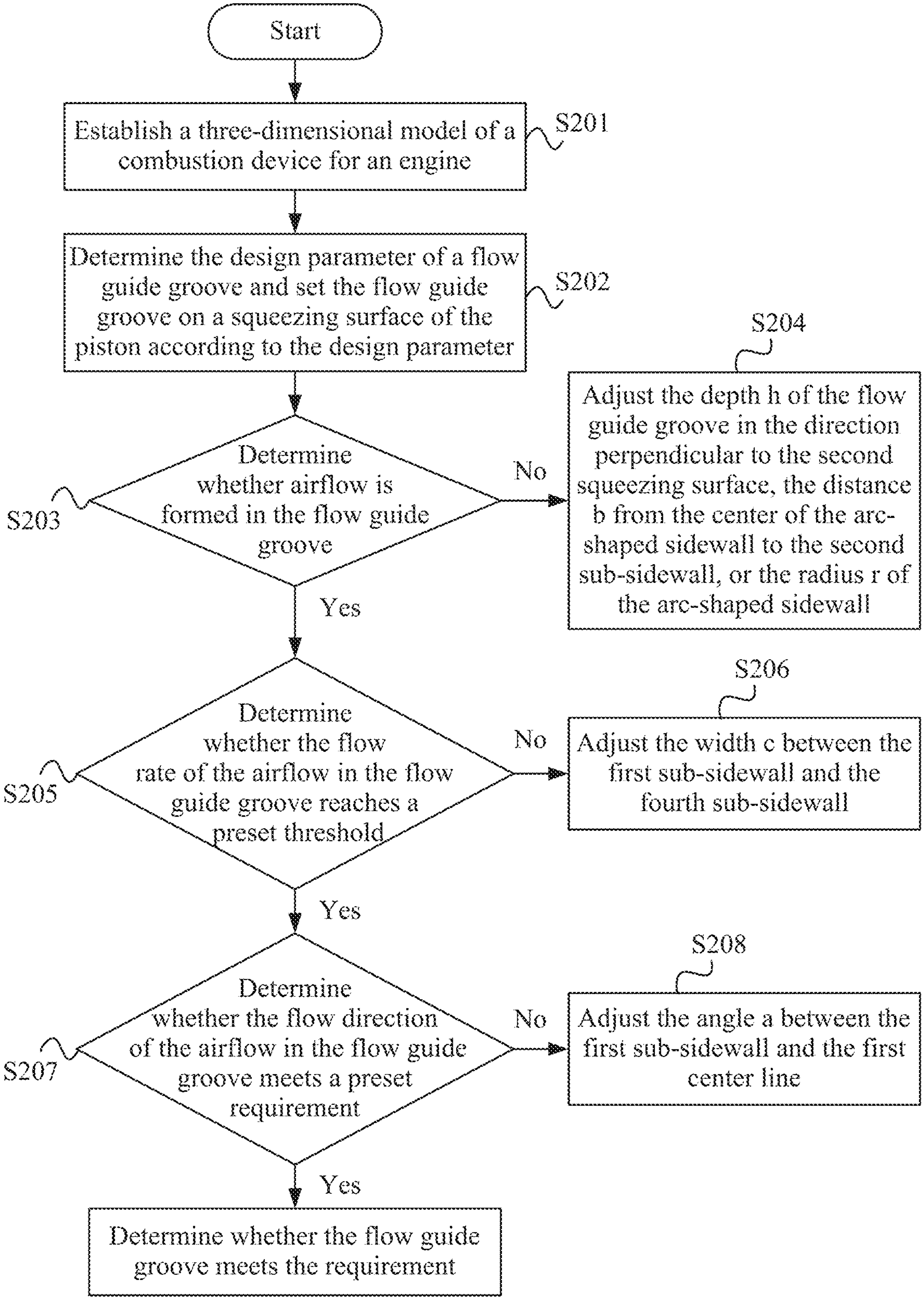
FIG. 6 is a flowchart of another method for designing a piston according to an embodiment of the present disclosure.

Optionally, FIG. 6 is a flowchart of another method for designing a piston according to an embodiment of the present disclosure. With reference to FIG. 3 and FIG. 6 and based on FIG. 5, simulating the three-dimensional model of the combustion device and determining whether the flow guide groove meets the requirement according to the simulation result include the steps below. It is determined whether airflow is formed in the flow guide groove; if not, the depth h of the flow guide groove in the direction perpendicular to the second squeezing surface, the distance b from the center of the arc-shaped sidewall to the second sub-sidewall, or the radius r of the arc-shaped sidewall is adjusted; or if yes, a next operation continues to be performed. It is determined whether the flow rate of the airflow in the flow guide groove reaches a preset threshold; if not, the width c between the first sub-sidewall and the fourth sub-sidewall is adjusted; or if yes, a next operation continues to be performed. It is determined whether the flow direction of the airflow in the flow guide groove meets a preset requirement; if not, the angle a between the first sub-sidewall and the first center line is adjusted; or if yes, it is determined that the flow guide groove meets the requirement. Therefore, the design method specifically includes the following steps:

In S201, a three-dimensional model of a combustion device for an engine is established.

The three-dimensional model of the combustion device is constructed based on the combustion device for an engine provided in any of the preceding embodiments.

In S202, the design parameter of a flow guide groove is determined, and the flow guide groove is set on a squeezing surface of the piston according to the design parameter.

In S203, it is determined whether airflow is formed in the flow guide groove; if not, S204 is performed; if yes, S205 continues to be performed.

In S204, the depth h of the flow guide groove in the direction perpendicular to the second squeezing surface, the distance b from the center of the arc-shaped sidewall to the second sub-sidewall, or the radius r of the arc-shaped sidewall is adjusted.

With reference to FIG. 3, the difference (b−r) between the distance b to the second sub-sidewall and the radius r of the arc-shaped sidewall is the minimum width of the third sub-groove formed between the edge of the piston 20 corresponding to the second notch at the second sub-sidewall 2231B and the fifth sub-sidewall 2232B. The minimum width of the third sub-groove may be changed by the adjustment of the distance b from the center of the arc-shaped sidewall to the second sub-sidewall or the value of the radius r of the arc-shaped sidewall.

Specifically, the depth h of the flow guide groove in the direction perpendicular to the second squeezing surface, the distance b from the center of the arc-shaped sidewall to the second sub-sidewall, or the radius r of the arc-shaped sidewall may be adjusted online according to the real-time result of the simulation to ensure that a stable airflow can be formed at the flow guide groove.

Optionally, with continued reference to FIG. 4, the depth h of the flow guide groove in the direction perpendicular to the second squeezing surface may be adjusted first. It can be understood that the size of the airflow formed at the flow guide groove is most affected by the depth h of the flow guide groove in the direction perpendicular to the second squeezing surface. When the simulation result shows that no flowing airflow is formed at the flow guide groove, the value of h may be adjusted first, either by increasing or decreasing. The specific adjustment may be made as required to quickly form a flowing airflow at the flow guide groove, improve simulation efficiency, and save the development cycle of early parameter design.

In S205, it is determined whether the flow rate of the airflow in the flow guide groove reaches a preset threshold; if not, S206 is performed; if yes, S207 continues to be performed.

In S206, the width c between the first sub-sidewall and the fourth sub-sidewall is adjusted.

Specifically, with continued reference to FIG. 3, the width between the first sub-sidewall 2231A and the fourth sub-sidewall 2232A is c, that is, the width of the first notch facing the combustion chamber 30 is c. By the adjustment of the value of c, the flow rate of the airflow in the flow guide groove 223 can be changed to reach a preset threshold. The preset threshold value of the flow rate of the airflow in the flow guide groove 223 may be set as required and is not specifically limited herein. When the flow rate of the airflow in the flow guide groove 223 reaches the preset threshold, it can be ensured that the flow rate of the airflow in the flow guide groove 223 corresponding to the final optimized c value is stable and that strong opposition to the tumble flow in the combustion chamber 30 is not caused. Moreover, the "instability" of the mixture airflow is reduced, the combustion is more stable, and the thermal efficiency of the engine is improved.

In S207, it is determined whether the flow direction of the airflow in the flow guide groove meets a preset requirement; if not, S208 is preformed; if yes, it is determined that the flow guide groove meets the requirement.

In S208, the angle a between the first sub-sidewall and the first center line is adjusted.

Specifically, with continued reference to FIG. 3, the angle between the first sub-sidewall 2231A and the first central line is a, that is, the angle between the first sub-groove formed by the first sub-sidewall 2231A and the fourth sub-sidewall 2232A and the first center line is a. By the adjustment of the size of a, the direction of the first notch 2230 of the flow guide groove 223 can be changed, thereby changing the flow direction of the airflow in the flow guide groove 223. Optionally, 0°≤a<60° so that the preset requirement is met. The preset required direction may be set as required and is not specifically limited herein. In this manner, when it is determined that a flowing airflow is formed in the flow guide groove 223, the flow rate of the airflow reaches a preset threshold, and the flow direction of the airflow in the flow guide groove 223 meets the preset requirement, it can be considered that the structure of the piston 20 obtained according to the simulation analysis meets the actual design requirement, and in the compression process, the "instability" of the mixture airflow in the combustion chamber 30 can be reduced. Moreover, the combustion is more stable, the cycle variation is reduced, the thermal efficiency of the engine is improved, and the tendency of knocking is reduced.

What is claimed is:

1. A combustion device for an engine, comprising a cylinder head, a cylinder block cooperating with the cylinder head, and a piston disposed in the cylinder block;

wherein the cylinder head comprises an intake valve setting region and an exhaust valve setting region;

a surface of the piston adjacent to the cylinder head comprises a first concave surface and a squeezing surface adjacent to the first concave surface, and the squeezing surface comprises a first squeezing surface corresponding to the intake valve setting region and a second squeezing surface corresponding to the exhaust valve setting region;

a combustion chamber is formed between the first concave surface and the cylinder head; and the second squeezing surface comprises a flow guide groove, the flow guide groove comprises two first notches facing the combustion chamber, the two first notches of the flow guide groove are arranged symmetrically with respect to a first center line of the piston, and the first center line is perpendicular to a dividing line between the intake valve setting region and the exhaust valve setting region; wherein the flow guide groove comprises a first sidewall and a second sidewall, a first end of the first sidewall and a first end of the second sidewall form one first notch of the two first notches, and a second end of the first sidewall and a second end of the second sidewall form another first notch of the two first notches;

the first sidewall comprises a first sub-sidewall, a second sub-sidewall, and a third sub-sidewall that are connected in sequence, the second sidewall comprises a fourth sub-sidewall, a fifth sub-sidewall, and a sixth sub-sidewall that are connected in sequence, the first sub-sidewall is disposed opposite to the fourth sub-sidewall, the second sub-sidewall is disposed opposite to the fifth sub-sidewall, and the third sub-sidewall is disposed opposite to the sixth sub-sidewall; and the first sub-sidewall and the third sub-sidewall are arranged symmetrically with respect to the first center line, the fourth sub-sidewall and the sixth sub-sidewall are arranged symmetrically with respect to the first center line, the second sub-sidewall is arranged symmetrically with respect to the first center line, and the fifth sub-sidewall is arranged symmetrically with respect to the first center line; and wherein the first sub-sidewall is parallel to the fourth sub-sidewall, and the third sub-sidewall is parallel to the sixth sub-sidewall; and an angle between the first sub-sidewall and the first center line is a, wherein 0°≤a<60°.

2. The combustion device for the engine according to claim 1, wherein the flow guide groove further comprises a second notch disposed at the second sub-sidewall, and the fifth sub-sidewall is an arc-shaped sidewall that concaves toward a center of the piston.

3. The combustion device for the engine according to claim 2, wherein a distance b from a center of the arc-shaped sidewall to the second sub-sidewall, a radius r of the arc-shaped sidewall, and a width c between the first sub-sidewall and the fourth sub-sidewall satisfies: $0.5*c \le b-r \le 1.5*c$, wherein c>0.

4. The combustion device for the engine according to claim 1, wherein a depth of the flow guide groove in a direction perpendicular to the second squeezing surface is h, and h satisfies: 0<h≤5 mm.

5. The combustion device for the engine according to claim 1, wherein the cylinder head comprises a canopy cylinder head, at least one intake valve is disposed in an intake valve setting region of the canopy cylinder head, at least one exhaust valve is disposed in an exhaust valve setting region of the canopy cylinder head, and the at least one intake valve and the at least one exhaust valve are symmetrically arranged; and the canopy cylinder head further comprises a spark plug disposed at a center of the canopy cylinder head.

6. A method for designing a piston applied to the combustion device for the engine according to claim 1, comprising:

establishing a three-dimensional model of the combustion device for the engine, wherein the three-dimensional model of the combustion device is constructed based on the combustion device for the engine;

determining a design parameter of a flow guide groove, and setting the flow guide groove on a squeezing surface of the piston according to the design parameter; and simulating the three-dimensional model of the combustion device, and determining whether the flow guide groove meets a requirement according to a simulation result.

7. The method for designing the piston according to claim 6, wherein the first sub-sidewall is parallel to the fourth sub-sidewall, and the third sub-sidewall is parallel to the sixth sub-sidewall;

the flow guide groove further comprises a second notch disposed at a second sub-sidewall, and the fifth sub-sidewall is an arc-shaped sidewall that concaves toward a center of the piston; and the design parameter comprises the angle a between the first sub-sidewall and the first center line, a distance b from a center of the arc-shaped sidewall to the second sub-sidewall, a radius r of the arc-shaped sidewall, a width c between the first sub-sidewall and the fourth sub-sidewall, and a depth h of the flow guide groove in a direction perpendicular to the second squeezing surface.

8. The method for designing the piston according to claim 7, wherein simulating the three-dimensional model of the combustion device, and determining whether the flow guide groove meets the requirement according to the simulation result comprise:

determining whether airflow is formed in the flow guide groove; based on a determination that airflow is not formed in the flow guide groove, adjusting the depth h of the flow guide groove in the direction perpendicular to the second squeezing surface, the distance b from the center of the arc-shaped sidewall to the second sub-sidewall, or the radius r of the arc-shaped sidewall; or based on a determination that airflow is formed in the flow guide groove, continuing to perform a next operation;

determining whether a flow rate of the airflow in the flow guide groove reaches a preset threshold; based on a determination that the flow rate of the airflow in the flow guide groove does not reach the preset threshold, adjusting the width c between the first sub-sidewall and the fourth sub-sidewall; or based on a determination that the flow rate of the airflow in the flow guide groove reaches the preset threshold, continuing to perform a next operation; and determining whether a flow direction of the airflow in the flow guide groove satisfies a preset requirement; based on a determination that the flow direction of the airflow in the flow guide groove does not satisfy a preset requirement, adjusting the angle a between the first sub-sidewall and the first center line; or based on a determination that the flow direction of the airflow in the flow guide groove satisfies a preset requirement, determining that the flow guide groove meets the preset requirement.

9. The method for designing the piston according to claim 6, wherein the flow guide groove further comprises a second notch disposed at the second sub-sidewall, and the fifth sub-sidewall is an arc-shaped sidewall that concaves toward a center of the piston.

10. The method for designing the piston according to claim 9, wherein a distance b from a center of the arc-shaped sidewall to the second sub-sidewall, a radius r of the arc-shaped sidewall, and a width c between the first sub-sidewall and the fourth sub-sidewall satisfies: $0.5*c \leq b-r \leq 1.5*c$, wherein $c>0$.

11. The method for designing the piston according to claim 6, wherein a depth of the flow guide groove in a direction perpendicular to the second squeezing surface is h, and h satisfies: $0<h\leq 5$ mm.

12. The method for designing the piston according to claim 6, wherein the cylinder head comprises a canopy cylinder head, at least one intake valve is disposed in an intake valve setting region of the canopy cylinder head, at least one exhaust valve is disposed in an exhaust valve setting region of the canopy cylinder head, and the at least one intake valve and the at least one exhaust valve are symmetrically arranged; and the canopy cylinder head further comprises a spark plug disposed at a center of the canopy cylinder head.

* * * * *